United States Patent [19]

Nakagawa

[11] Patent Number: 5,190,416

[45] Date of Patent: Mar. 2, 1993

[54] METHOD FOR REDUCING PRESSURE LOSSES IN CYCLONE SEPARATOR AND DUCTING SYSTEM FOR CYCLONE SEPARATOR

[75] Inventor: Yasuhiro Nakagawa, Apple Valley, Calif.

[73] Assignee: Mitsubishi Materials Corporation, Tokyo, Japan

[21] Appl. No.: 758,737

[22] Filed: Sep. 12, 1991

Related U.S. Application Data

[63] Continuation-in-part of Ser. No. 613,316, Nov. 8, 1990, abandoned.

[51] Int. Cl.⁵ ...................... B65G 53/40; B65G 53/60
[52] U.S. Cl. ..................................... 406/155; 406/173
[58] Field of Search ............... 406/156, 157, 168, 173, 406/155

[56] References Cited

U.S. PATENT DOCUMENTS

| | | | |
|---|---|---|---|
| 1,380,698 | 6/1921 | Anspach et al. | 406/173 X |
| 3,266,847 | 8/1966 | Murray | 406/173 |
| 3,924,901 | 12/1975 | Phillips | 406/168 X |
| 4,834,586 | 5/1989 | Depew | 406/173 X |

Primary Examiner—Charles A. Marmor
Assistant Examiner—Andrew C. Pike
Attorney, Agent, or Firm—Charles E. Baxley

[57] ABSTRACT

A method for reducing pressure losses in a cyclone separator includes introducing a gas entraining a particulate material into a duct connected to the cyclone separator, separating at least a portion of the particulate material through an opening formed in a bottom surface of a horizontally extending section of the duct in proximity to a junction point of the duct to the cyclone separator, and introducing the gas entraining the particulate material into the cyclone separator. A ducting system for the cyclone separator includes the duct and the opening. The particulate material is prevented from being deposited and heaped in the vicinity of the junction point.

2 Claims, 2 Drawing Sheets

METHOD FOR REDUCING PRESSURE LOSSES IN CYCLONE SEPARATOR AND DUCTING SYSTEM FOR CYCLONE SEPARATOR

CROSS-REFERENCE TO RELATED APPLICATION

This application is a continuation-in-part application of application Ser. No. 07/613,316 filed Nov. 8, 1990, now abandoned.

BACKGROUND OF THE INVENTION

This invention relates to a method for reducing pressure losses in a cyclone separator and a ducting system by preventing a particulate material from being deposited and heaped in the vicinity of a junction point between a duct and the cyclone separator to reduce pressure losses in the cyclone separator.

A cyclone separator is a device well-known in the art as a dust collecting system for separating and collecting a particulate material from a gas entraining the particulate material under a centrifugal force. With the cyclone separator, the gas is introduced into its funnel-shaped shell by means of a duct connected to the shell in a tangential direction to impart a gyratory motion to the gas to separate the particulate material from the gas.

The duct for introducing the gas into the cyclone separator has a horizontally extending section in the vicinity of a junction point to the funnel-shaped shell of the separator. The horizontally extending section is composed of a first horizontal portion having a width of the duct and a second horizontal portion extending narrowly from the first portion and connecting with the funnel-shaped shell in a tangential direction thereof. It is at the first and second portions that the particulate material tends to be deposited so as to disturb the flow of the introduced gas to thereby cause the increase of pressure losses in the cyclone separator. In this case, a sufficient gyratory motion of the gas is not produced in the inside of the cyclone separator, such that efficient separation of the particulate material from the gas cannot be achieved.

The conventional practice for preventing a particulate material from being deposited at the horizontally extending duct section has been to provide the duct section with a tilt to cause the material to slide thereon to prevent its deposition. More specifically, the horizontally extending duct section is inclined downwards towards its upstream side or, alternatively, towards the funnel-shaped shell of the cyclone separator. Still alternatively, the horizontally extending duct section has a portion inclined downwards towards its upstream side and a portion inclined downwards towards the funnel-shaped shell of the cyclone separator.

The above described conventional practice has, however, the following disadvantages. First of all, if the horizontally extending duct section is tilted downwards towards the upstream side of the duct, the particulate material descending on the inclined portion is kept there stationarily by the entering gas stream, unless the tilt is steep to some extent, with the result that the particulate material is deposited on the inclined duct section to disturb the introduced gas flow to thereby cause the increase of pressure losses in the cyclone separator. In addition, the particulate material continues to be deposited and, when reaching a certain amount or volume, the material can no longer be kept stationarily by the entering gas stream so that it collapses intermittently and slides down along the inclined section towards the upstream side of the duct. This also causes a gas flow to be disturbed, leading to increased pressure losses in the cyclone separator. If the horizontally extending duct section is inclined downwards towards the cyclone separator, the gas is introduced in the downward tangential direction into the inside of the shell of the cyclone separator so that the gas is directed towards a discharge duct provided at the bottom of the separator without a sufficient gyratory motion being imparted to the gas in the cyclone separator. As a result of insufficient separation of the gas and the particulate material in the shell of the cyclone separator, the separation efficiency of the cyclone separator is lowered. Finally, if the horizontally extending section has a portion inclined downwardly towards the upstream side of the duct and also a portion inclined downwardly towards the shell, the above described deficiencies are presented simultaneously. In addition, since the ordinary duct annexed to the cyclone separator is extended horizontally in the vicinity of the junction point to the shell, the remodelling construction work for imparting a tilt to the duct section is troublesome and also results in increased costs.

SUMMARY OF THE INVENTION

It is therefore an object of the present invention to provide a method for reducing pressure losses in a cyclone separator and stabilizing the collection efficiency of the cyclone separator by preventing a particulate material entrained in a gas from being deposited in a horizontally extending section of a duct adapted for introducing the gas into the cyclone separator and by allowing the gas to be introduced into the separator without disturbing the gas flow and to provide a ducting system for the cyclone separator.

It is another object of the present invention to provide the above method and system which permit the conventional ducting to be remodelled at lower costs.

The above and other objects of the present invention will become apparent from the following description.

For accomplishing the above objects, the present invention provides a method for reducing pressure losses in a cyclone separator comprising introducing a gas entraining an entry particulate material into a duct connected to the cyclone separator, separating at least a portion of the particulate material through an opening formed in a bottom surface of a horizontally extending section of the entry duct in proximity to a junction point of the entry duct to the cyclone separator, and introducing the gas entraining the particulate material into the cyclone separator whereby the particulate material is prevented from being deposited and heaped in the vicinity of the junction point.

The present invention also provides a ducting system for a cyclone separator comprising an entry duct for introducing a gas entraining a particulate material into the cyclone separator and an opening formed in a bottom surface of a horizontally extending section of the entry duct in proximity to a junction point of the entry duct to the cyclone separator, whereby at least a portion of the particulate material is separated through the opening and the gas entraining the particulate material is introduced into the cyclone separator to prevent particulate material from being deposited and heaped in the vicinity of the junction point to reduce pressure losses in the cyclone separator.

DESCRIPTION OF THE PREFERRED EMBODIMENTS

Figure 1:
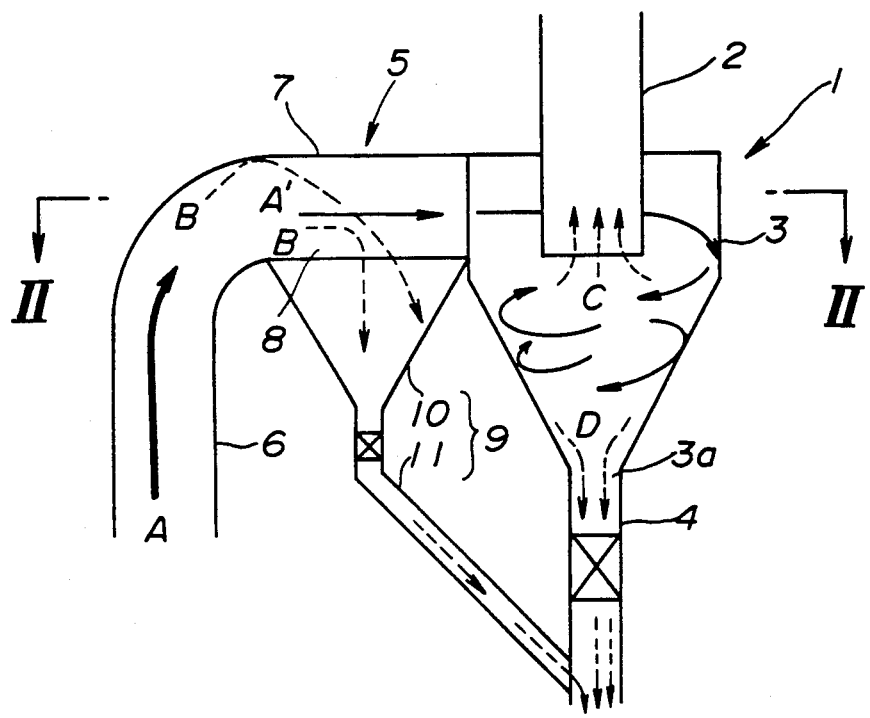
FIG. 1 is a diagrammatic front view showing an embodiment of a ducting system provided with an opening according to the present invention in conjunction with a funnel-shaped shell of a cyclone separator connected to the ducting system.

Referring to FIG. 1 of the accompanying drawings, the reference numeral 1 denotes a cyclone separator provided with an entry duct 5 having a ducting system or structure according to the present invention. The cyclone separator 1 includes a funnel-shaped shell 3 for receiving a dust-containing gas from the entry duct 5 and for separating the gas from the dust entrained therein, a discharge port 3a formed at the bottom of the shell 3 for discharging the dust separated from the gas in the shell 3 out of the shell 3, a discharge duct 4 connected to the discharge port 3a, and a gas discharge duct 2 for transporting the separated gas towards an exterior device, not shown.

Figure 2:
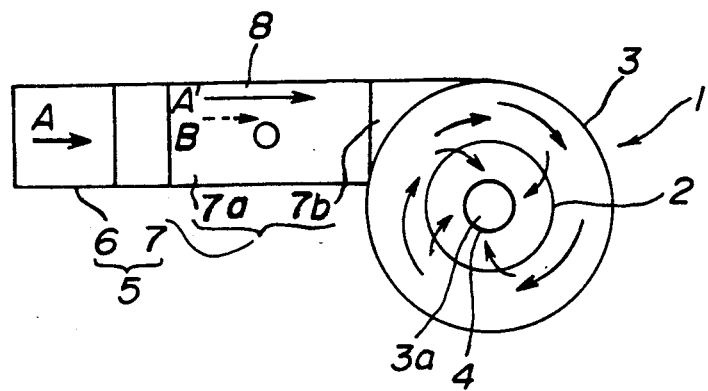
FIG. 2 is a cross-sectional view taken along line II—II of FIG. 1.

Still referring to FIG. 1 in conjunction with FIG. 2, the duct 5 is comprised of an upstanding section 6 spaced from the cyclone separator 1 and a horizontal section 7 extending horizontally from the upper terminal end of the upstanding section 6 and connected tangentially to the shell 3. The horizontal section 7 is comprised of a first horizontal portion 7a having a width of the duct 5 and a second horizontal portion 7b extending narrowly from the first portion 7a and connecting with the shell 3 in a tangential direction thereof, and the section 7 is provided with an opening 8 having an area about equal to the area of the bottom surface of the first horizontal portion 7a. To this opening 8 connected is a hopper 9 having a triangular vertical cross section and a rectangular horizontal cross section. As will be explained subsequently, the hopper 9 is comprised of a main hopper body 10 for collecting dust that might otherwise be deposited in the portion 7a and a discharge pipe 11 connected to a discharge opening formed in the bottom of the main hopper body 10. The discharge pipe 11 is connected to the discharge duct 4 at a sufficiently lower point thereof to prevent the flow of the dust back into the cyclone separator 1 by way of the discharge duct 4.

In FIGS. 1 and 2, the flow of the gas entraining the dust is indicated by arrows for illustrating the function of the ducting system of the present invention. As shown in these figures, the gas entraining the dust, as indicated by an arrow A, ascends in the entry duct 5 from the upstream side of the upstanding section 6 so as to flow through the horizontal section 7. During this time, a part of the dust entrained in the gas as indicated by an arrow B is separated from the gas by its own gravity or by colliding against the upper surface of a transition zone between the section 6 and the portion 7a to descend into the hopper 9 through the opening 8 so as to be discharged into the inside of the discharge duct 4 of the cyclone separator 1 by way of the discharge pipe 11 of the hopper 9. On the other hand, the gas flow entraining the remaining amount of the dust travels over the opening 8 as indicated by an arrow A' to proceed from the portion 7b into the inside of the cyclone separator 1 to perform a gyratory movement within the shell 3 of the cyclone separator 1. This gyratory movement of the gas, which is well-known per se, is now explained only briefly. The gas performing the gyratory movement in the shell 3 descends gradually therein by its gravity as it collides repeatedly against the wall surface of the shell 3. At this time, the dust having a finer particle size is caused to ascend by the gas stream in the cyclone separator 1 as indicated by an arrow C so as to be discharged towards an exterior equipment, not shown, via the gas discharge duct 2. Conversely, the dust of coarser particle size continues to descend within the shell 3 as shown by an arrow D so as to be discharged through the discharge duct 4. The dust thus discharged from the discharge duct 4 is united with the dust discharged via the discharge pipe 11 of the hopper 9.

Figure 3:
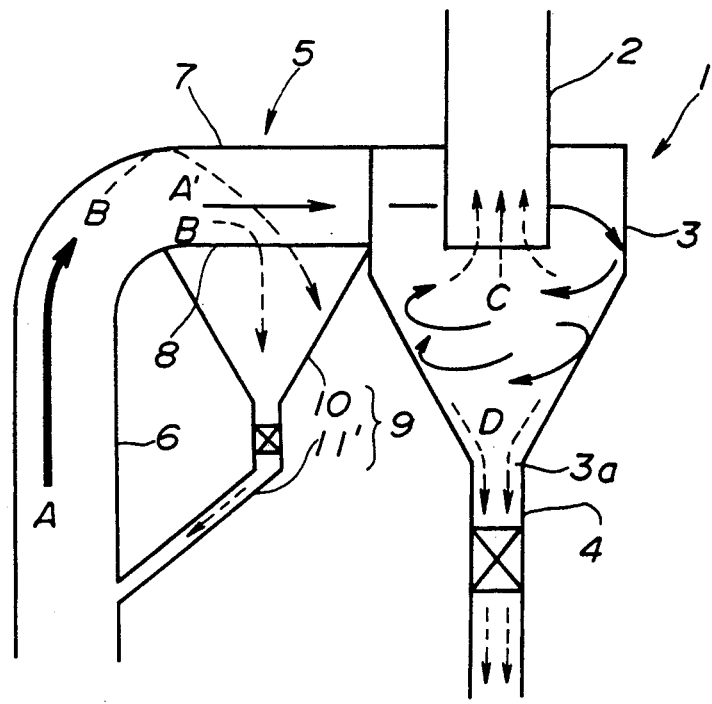
FIG. 3 is a diagrammatic front view showing another embodiment of the ducting system in conjunction with a funnel-shaped shell of a cyclone separator.
Figure 4:
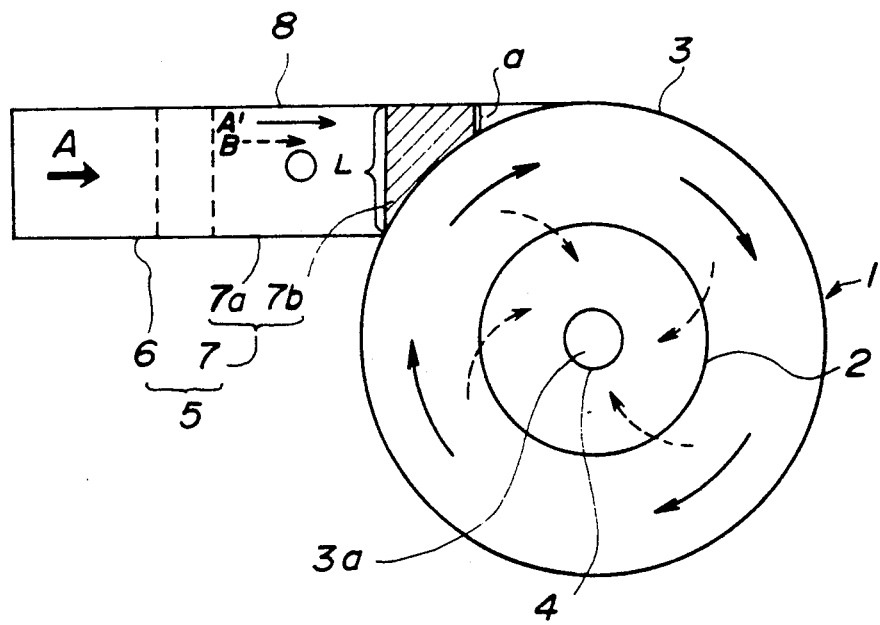
FIG. 4 is a cross-sectional view similar to FIG. 2 showing a further embodiment of the ducting system provided with an opening different from the opening of FIG. 2.

FIGS. 3 and 4 each illustrates a modified embodiment of the present invention. In these figures, the same reference numerals are used to depict the same parts or components as those shown in FIGS. 1 and 2.

The embodiment shown in FIG. 3 mainly differs from the embodiment shown in FIG. 1 in that the discharge pipe 11' of the hopper 9 is not connected to a downstream side point of the discharge duct 4 of the hopper 9, but is connected to the upstanding section 6 of the entry duct 5 to return the dust collected by the hopper 9 into the entry duct 5 for possible reutilization.

FIG. 4 shows an embodiment in which an area of the opening 8 is increased by extending the opening 8 shown in FIG. 1 to the shell 3, that is, by extending the opening 8 to the second portion 7b. In this embodiment, the opening 8 shown in FIG. 1 may be extended to the shell 3 to a degree that the formula of at least $a = L/3$ is formed where L and a indicate the widths of the openings 8 at their ends in the vicinity of the shell 3 in FIGS. 1 and 4, respectively. According to the ducting system having the opening 8 in FIG. 4, the area on which particulate material may be heaped and deposited is decreased as compared to the ducting system shown in the embodiment of FIG. 1 so that the disturbance of the gas flow in the separator 1 is reduced more effectively.

Although the present invention has been described with reference to the preferred embodiments, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A method for reducing pressure losses in a cyclone separator comprising introducing a gas entraining a particulate material into an entry duct connected to the cyclone separator, separating at least a portion of said particulate material through an entry opening formed in a bottom surface of a horizontally extending section of said entry duct in proximity to a junction point of said entry duct to the cyclone separator, and introducing the gas entraining said particulate material into the cyclone separator, a hopper being connected to said entry opening and said portion of said particulate matering being discharged by way of a discharge opening of said hopper, said discharge opening of said hopper being connected to a discharge duct of the cyclone separator for introducing said portion of said particulate material into said discharge duct, said horizontally extending section comprising a first horizontal portion having a width of said entry duct and a second horizontal portion extending narrowly from the first portion and connecting with said separator in a tangential direction thereof, said method further comprising separating at least said portion of said material through said entry opening having an area about equal to an area of a bottom surface of the first portion plus an area of a bottom surface of the second portion having at least one-third width of said width of the entry duct whereby the particulate material is prevented from being deposited and heaped in proximity to said junction point.

2. A ducting system for a cyclone separator comprising an entry duct for introducing a gas entraining a particulate material into the cyclone separator, an entry opening formed in a bottom surface of a horizontally extending section of said entry duct in proximity to a junction point of said duct to the cyclone separator, and a hopper connected to said entry opening, an entry portion of the particulate material being discharge by way of a discharge opening of said hopper, said discharge opening of said hopper being connected to a discharge duct of said cyclone separator, said entry portion of the particulate material being introduced into said discharge duct, said horizontally extending section comprising a first horizontal portion having a width of said entry duct and a second horizontal portion extending narrowly from the first portion and connecting with said separator in a tangential direction thereof, and said entry opening having an area about equal to an area of a bottom surface of the first portion plus an area of a bottom surface of the second portion having at least one-third the width of the entry duct, whereby at least an entry portion of said particulate material is separated through said entry opening and the gas entraining the particulate material is introduced into the cyclone separator to prevent the particulate material from being deposited and heaped in proximity to said junction point to reduce pressure losses in the cyclone separator.

* * * * *

UNITED STATES PATENT AND TRADEMARK OFFICE
CERTIFICATE OF CORRECTION

PATENT NO. : 5,190,416
DATED      : March 2, 1993
INVENTOR(S) : Yasuhiro Nakagawa It is certified that error appears in the above-identified patent and that said Letters Patent is hereby corrected as shown below:

Column 5, line 1,   the word "matering" should read --material--.

Column 6, line 3,   the word "discharge" should read --discharged--.

Signed and Sealed this

Fourteenth Day of December, 1993

Attest:

BRUCE LEHMAN

*Attesting Officer*   *Commissioner of Patents and Trademarks*